(12) United States Patent  
Sturdivant et al.

(10) Patent No.: US 8,594,638 B2  
(45) Date of Patent: Nov. 26, 2013

(54) DYNAMIC WIRELESS NETWORKS AND INTERACTIVE WIRELESS INFORMATION COMMUNICATION AND DELIVERY SYSTEMS FOR CALCULATING DISTANCE TO AN OBJECT

(75) Inventors: Rick Sturdivant, Placentia, CA (US); Joaquin Felipe Brown, Culver City, CA (US); David E. Brown, Altadena, CA (US); Chris Turner, Orange, CA (US); Aaron Dewitt, Corona, CA (US)

(73) Assignee: IVIU Technologies, Inc., Anaheim, CA (US)

( * ) Notice: Subject to any disclaimer, the term of this patent is extended or adjusted under 35 U.S.C. 154(b) by 131 days.

(21) Appl. No.: 13/310,761

(22) Filed: Dec. 4, 2011

(65) Prior Publication Data

US 2013/0040588 A1     Feb. 14, 2013

Related U.S. Application Data

(60) Provisional application No. 61/522,145, filed on Aug. 10, 2011.

(51) Int. Cl.
*H04M 3/42* (2006.01)
*H04W 24/00* (2009.01)

(52) U.S. Cl.
USPC ............. 455/414.1; 455/456.1; 455/41.2

(58) Field of Classification Search
USPC ........... 455/456.1, 456.3, 457, 41.2, 414.1
See application file for complete search history.

(56) References Cited

U.S. PATENT DOCUMENTS

| | | | |
|---|---|---|---|
| 7,886,964 B2 | 2/2011 | Steinecker | |
| 7,920,850 B1 | 4/2011 | Harris | |
| 8,041,369 B2 * | 10/2011 | Smith et al. | 455/456.1 |
| 2006/0230415 A1 | 10/2006 | Roeding | |
| 2007/0281714 A1 * | 12/2007 | Douglas et al. | 455/456.1 |
| 2011/0028160 A1 | 2/2011 | Roeding | |
| 2011/0029359 A1 | 2/2011 | Roeding | |
| 2011/0029362 A1 | 2/2011 | Roeding | |
| 2011/0029364 A1 | 2/2011 | Roeding | |
| 2011/0029370 A1 | 2/2011 | Roeding | |
| 2011/0195701 A1 * | 8/2011 | Cook et al. | 455/422.1 |
| 2012/0244875 A1 * | 9/2012 | Cardona et al. | 455/456.1 |
| 2012/0264447 A1 * | 10/2012 | Rieger, III | 455/456.1 |
| 2013/0084801 A1 * | 4/2013 | Royston et al. | 455/41.1 |
| 2013/0149991 A1 * | 6/2013 | Hepo-Oja | 455/404.2 |

* cited by examiner

*Primary Examiner* — Blane J Jackson
(74) *Attorney, Agent, or Firm* — Law Office of Robert E. Kasody

(57) ABSTRACT

A method is disclosed for calculating a distance to objects or a nearest object to a wireless enabled device. The method includes the steps of broadcasting a signal by the wireless enabled device to data tags, receiving by the data tags the signal by the wireless enabled device, and obtaining by each of the data tags a signal strength indicator of the wireless enabled device based on the signal from the wireless enabled device. Each of the data tags in a range transmits a signal to the wireless enabled device including the signal strength indicator of the wireless enabled device. Each signal strength indicator of the wireless enabled device is communicated to a positioning and communication system.

20 Claims, 9 Drawing Sheets

\* Requires time multiplexing in Smart Phone 2 if data tag is also wifi (Smart Phone UDP Drawback, see text). Other data tags may not have this restriction

TABLE I: DEVICE TAGS MESSAGING PROTOCOLS

| Message Id | Description | Content | TX LVL | SW 1 | SW 2 | SW 3 | Notes |
|---|---|---|---|---|---|---|---|
| IV00001 | Request Device ID, RSSI | (1) | n/a | n/a | n/a | n/a | |
| IV00002 | Response fr Device | (2) | n/a | n/a | n/a | n/a | |
| IV10000 | Enter Preferences Mode | | n/a | n/a | n/a | n/a | |
| IV19999 | Exit Preferences Mode | 1 or 0 | n/a | n/a | n/a | n/a | 1 stores all changes, 0 cancels the changes since IV10000 |
| IV20001 | Set Battery Level Send Freq | n Min | n/a | n/a | n/a | n/a | |
| IV20002 | Set Switches | "000 | n/a | Off | Off | Off | |
| IV20002 | | 1 | n/a | Off | Off | 1 | |
| IV20002 | | 10 | n/a | Off | On | Off | |
| IV20002 | | 11 | n/a | Off | On | On | |
| IV20002 | | 111 | n/a | On | On | On | |
| IV20002 | | etc. | n/a | | | | binary number 8 settings 000 to 111 |
| IV20010 | Set Tx Lvl | 0-12 | 0-12 | n/a | n/a | n/a | |
| IV29999 | Settings Result | -1 0 | n/a | n/a | n/a | n/a | Failed OK |

1. Msg Id + "," + "IP:" + sending IP address
2. Msg Id + "," + "IP:" + sending (emitter) IP Address
3. "," + "RSSI" + signal strength received from device

FIG. 11

DYNAMIC WIRELESS NETWORKS AND INTERACTIVE WIRELESS INFORMATION COMMUNICATION AND DELIVERY SYSTEMS FOR CALCULATING DISTANCE TO AN OBJECT

PRIORITY AND RELATED APPLICATIONS

This US non-provisional utility patent application claims priority to and incorporates by reference in its entirety US provisional application entitled "DYNAMIC WIRELESS NETWORKS AND INTERACTIVE WIRELESS INFORMATION COMMUNICATION AND DELIVERY SYSTEMS", Ser. No. 61/522,145 filed on Aug. 10, 2011, and claims priority to and incorporates by reference in its entirety co-pending U.S. Utility patent application Ser. No. 13/010, 437 filed on Jan. 20, 2011.

FIELD OF THE SUBJECT MATTER

The field of the subject matter is broadly a dynamic wireless network and more specifically, an interactive wireless information communication and delivery system is disclosed that includes software, hardware and related methods.

BACKGROUND

Consumers who own and use wireless two-way communication devices, such as smart phones, personal digital assistants or PDAs, hand-held devices, and other two-way communication devices, are constantly looking for new ways to use that device to interact with one's surroundings and/or receive information about their surroundings or specific items in a certain range. In addition, consumers do not want to purchase, rent or carry additional devices other than their primary device mostly based on convenience. It is this desire that has caused the dramatic increase in device applications or software "apps" that allow the user to accomplish additional tasks on a smart phone.

For example, a tourist who wants to tour a museum. The tourist will pay a fee to enter the museum, buy a guidebook and/or rent an electronic device that contains an education program on the artwork in the museum. The tourist then walks around the museum listening to the recording. The tourist must control the recording depending on where he/she is in the museum. The tourist follows a specified path, since the recording is fixed and cannot be changed based on location without rerecording the updated information.

There are conventional systems that utilize the user's smart phone in some way. For example, there are conventional systems that require the wireless-enabled device to scan for WiFi™ transceivers and many wireless-enabled devices are not available in response to the scan mode. In this instance, the wireless-enabled device is not able to detect the presence of transceivers. On the other hand, other smart phones may not be able to "know" or "comprehend" the relative position of nearby transmitters or able to correct WiFi™ protocol.

Another issue with many conventional devices is the requirement of additional hardware by the smart phone user. Solutions such as Active Bat™, for example, may require a special sound receiver and transmitter. Other WiFi™ GPS or global positioning systems solutions such as Sky Hook™ utilize standard WiFi™/GPS hardware which may provide a ten to twenty meter accuracy, and may not be very accurate for a moving or roving user in a large room with other users.

One additional piece of the puzzle is the information that is being accessed. As mentioned with the museum example outlined above, user may access a pre-taped recording organized in accordance with a specific path through the museum. Other conventional systems may require users to press a button or activate a recording at the site of each individual piece of art or interesting item. Obviously, this solution is problematic, because tourists are constantly arriving at or leaving a piece of art, and so, if someone arriving at the piece of art presses the button to activate the site recording, another arriving late will not hear it from the beginning Some conventional solutions link to web pages.

Many conventional solutions may not track interest expressed in a particular object and/or the time spent in front of that object by each individual observer. Other conventional solutions may not allow the tourist or observer to get targeted information and/or promotional items based on the time spent in front of the artwork. For example, it would be ideal if a system were produced that sent the observer a note about a sale on Monet posters in the gift shop, if the observer spent a lot of time looking at the Monet collection. Current solutions also lack the ability to manage information in diverse formats and to allow users to record interests in specific objects.

Furthermore, there are global positioning systems (GPS) and related software that allow a user or operator to get some information about a particular location. For example, when a driver is operating an automobile with GPS, the system will show the operator what restaurants or gas stations are at the upcoming exits. While the driver may arbitrarily decide to exit and pick the first restaurant, there is no information that can be transmitted to the restaurant as to whether the driver searched for that restaurant or restaurant chain, what that driver ordered when he/she stopped, whether the driver used the drive-thru window or came inside of the restaurant, and other information that may help the restaurant or restaurant chain better market to consumers. There is a need for solutions for pushing out promotions to the prospective consumers based on their previous preferences coupled with their immediate proximity to their desired restaurant or gas station chains.

In a smaller environment, a trade show may have a hundred company booths with booth attendants who are trying to get someone to stop, chat, provide a business card and ideally, purchase what the company is selling. Trade show booths usually put out a fishbowl for business cards using a giveaway item as an enticement for the attendee to stop and talk or provide a business card. One of the new methods of getting information from attendees is for the booth workers to scan the badge of the attendee with a wireless scanner. This process results in a report being communicated to the company of additional information not usually found on a normal business card. Additional information may include what products the attendee is interested in, what journals the attendee reads, what type of business the attendee is in and other specific information provided by the attendee when registering for the tradeshow or provided to the organizing entity earlier.

There is a need for method of tracking attendees from booth to booth, whether they approach a particular booth, determining how long attendees linger at a booth, and whether they visit the booth multiple times and other information that may help the companies involved in the trade show. Consequently, there is a need in the arts for one or more systems that meet the needs and desires of both the consumer and the transmission-controlling entity, such as a museum, trade show, restaurant, sporting venue, retail outlet, theme park, hospital or any other suitable business.

Specifically, there is a need for wireless information communication and delivery systems that provide improved communication between transceivers and wireless-enabled devices based on software applications and between transceivers and wireless-enabled devices provide a wireless network that has transceivers having several modes of operation. For instance, reduced or limited interference mode that allows transceivers to establish communication with localized wireless enabled devices or a distant access mode for communication with distant wireless access points. Other needs may include for enhanced user experience including combining the configurable transceiver with a modified protocol or improved accuracy of the transmission of communication to the user as he/she moves around an environment. Still other needs including utilize the information and experiences of other users to add information and improve accuracy of the information and experience and/or utilize the information transmitted by other users to improve the information related to the distance above, below and around the observer. For example, a need for a novel system that can manage various formats of information, along with including the ability to search through the information system's history by using sophisticated and up-to-date search mechanisms and can provide promotional items or other information to a user based on the user's tracking input.

SUMMARY

Wireless information communication and delivery systems are described herein that include at least one wireless-enabled device, a device location system, a positioning and communication system, and an information repository system.

A configurable wireless protocol device is disclosed that includes a multi-modal transceiver that can establish a communication network with a local wireless-enabled device.

A wireless network is described that includes one or more configurable wireless protocol devices, one or more wireless-enabled devices, and one or more wireless access points.

Methods of locating a wireless-enabled device are described and include providing a wireless-enabled device, providing a configurable wireless protocol device including a modified wireless-protocol, and utilizing the configurable wireless protocol device to actively scan for the wireless-enabled device.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE FIGURES AND TABLE

Figure 4:
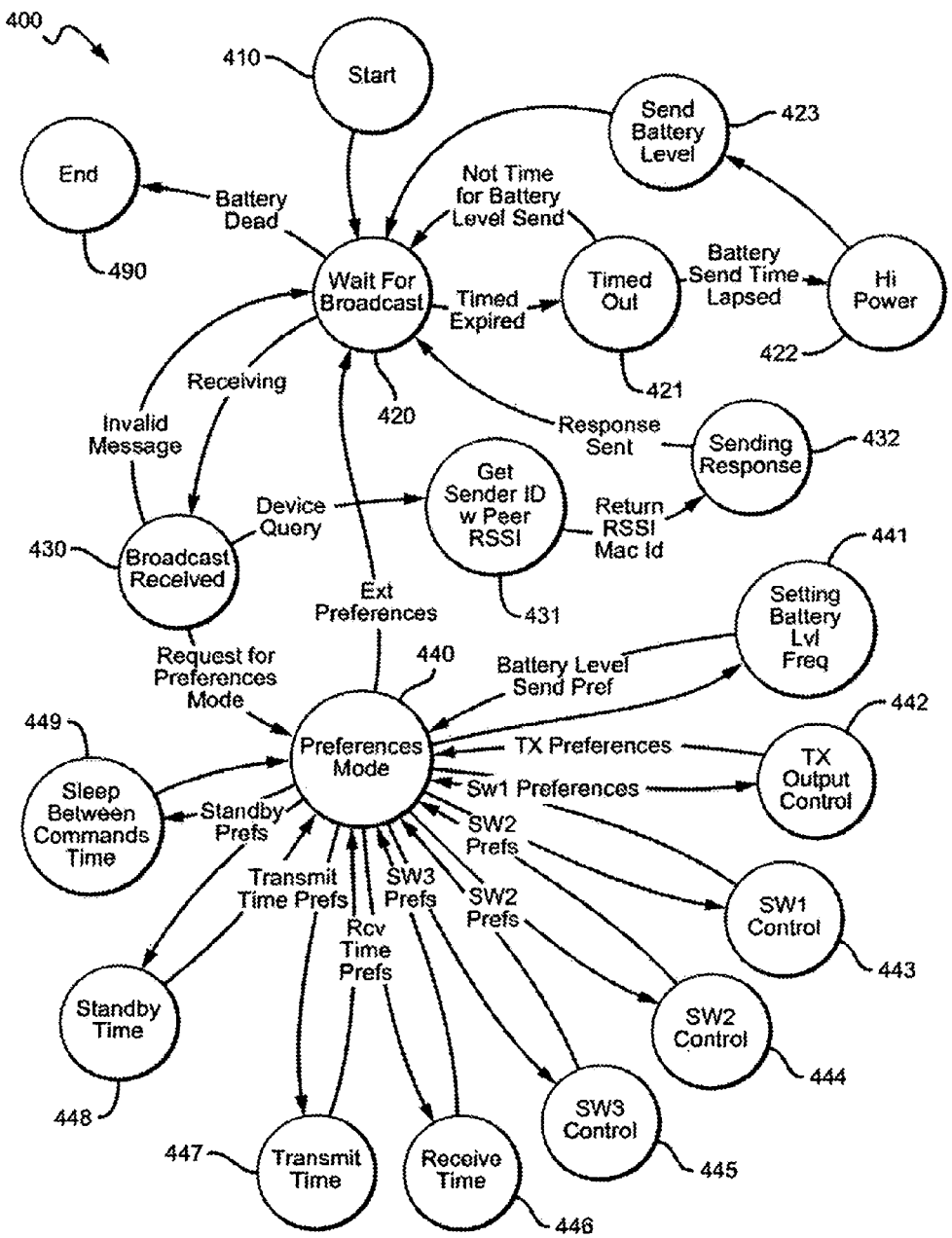

Wireless information communication and delivery systems illustrate software-based digital data tags associated with the tagged objects and appropriate applications software be downloaded and activated on the wireless-enabled devices, as shown in FIG. 4.

Figure 5:
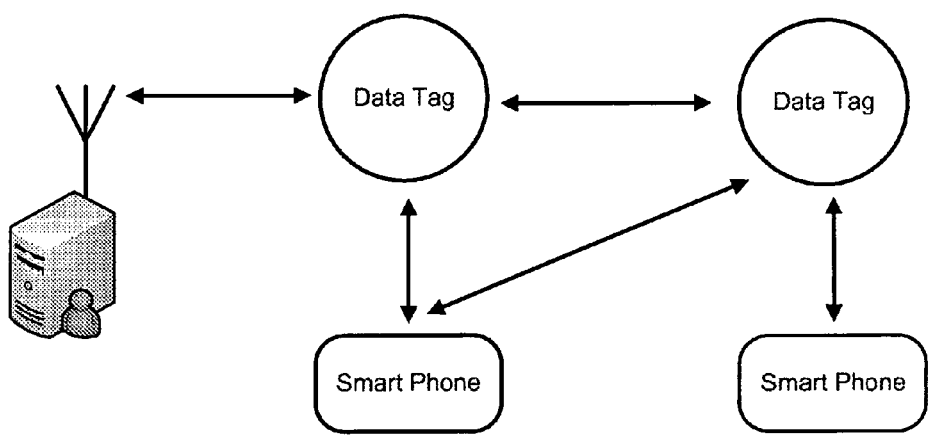

FIG. 5 illustrates an embodiment with Wi-Fi AdHoc mode enabled.

Figure 6:
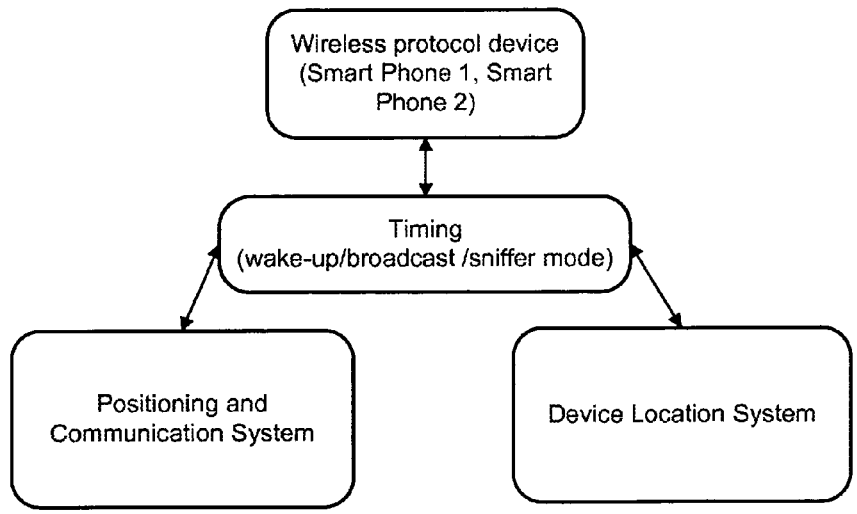

FIG. 6 illustrates a hibernation/wake-up/use scenario.

Figure 7:
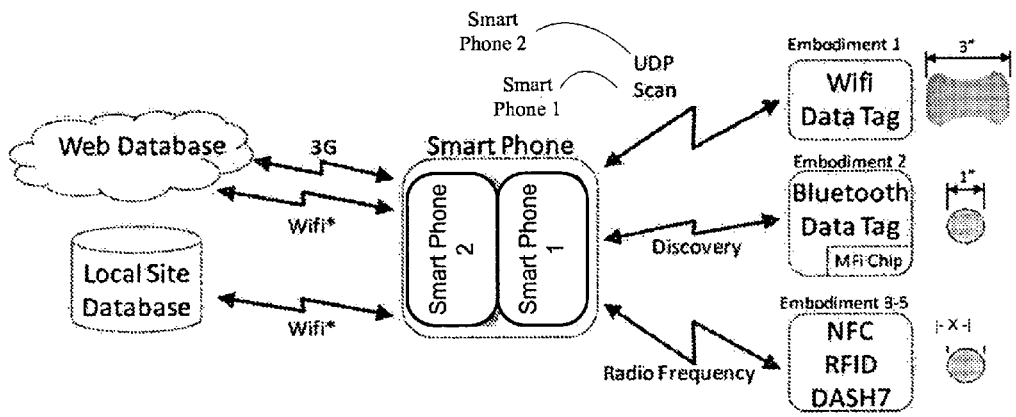

FIG. 7 illustrates a communication that occurs between the smart phone, data tag, and databases.

Figure 8:
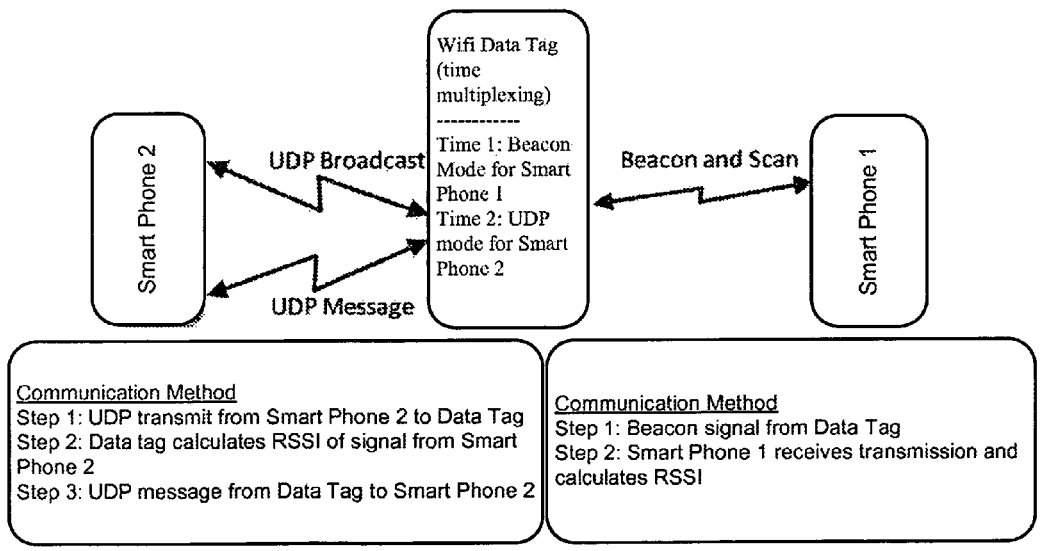

FIG. 8 illustrates a communication methodology between Smart phone 1 and Smart phone 2 and Wi-Fi data tag.

Figure 9:
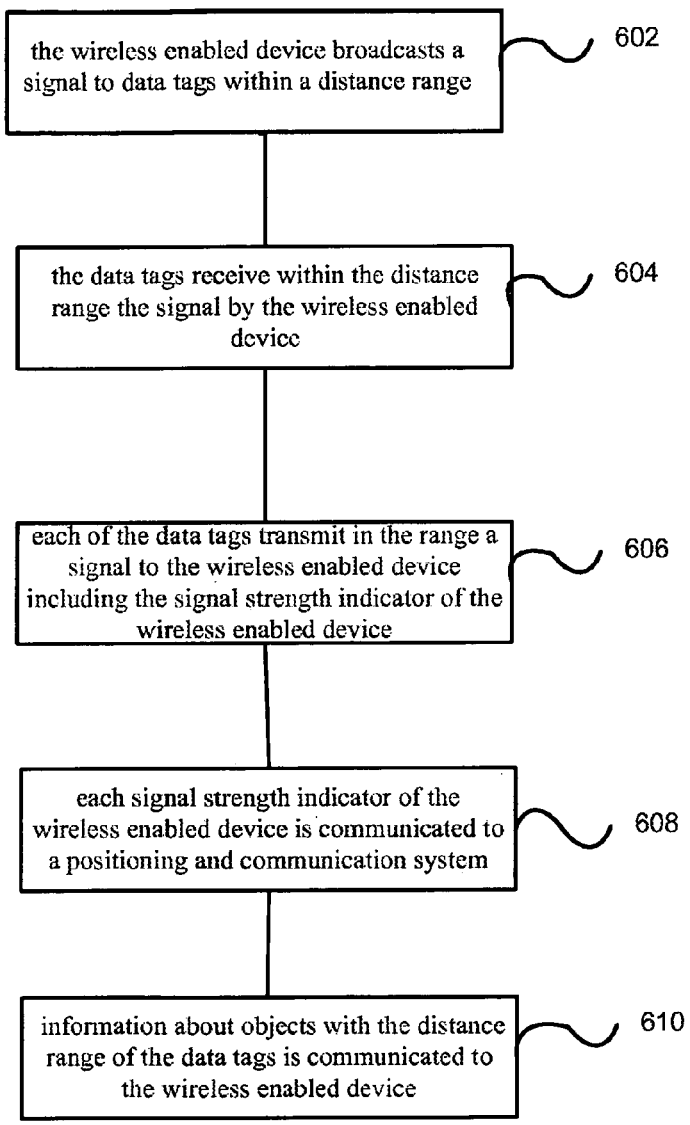

FIG. 9 illustrates a method for distancing objects and obtaining information about specific objects in accordance with an embodiment of the present application.

Figure 10:
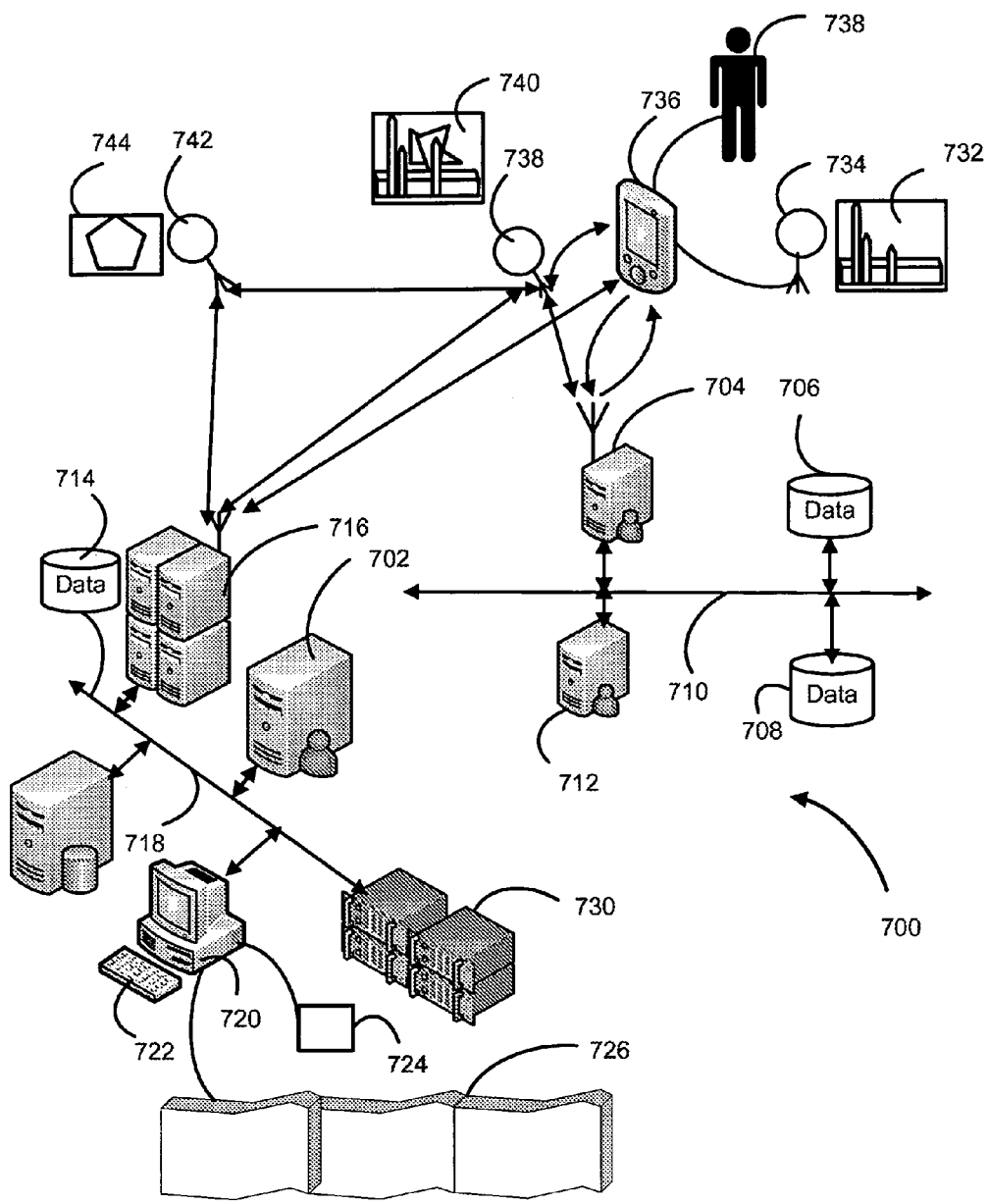

FIG. 10 illustrates an exemplary system that illustrates distancing objects and obtaining information about specific objects in accordance with an embodiment of the present application.

FIG. 11 illustrates Table 1 outlines exemplary messages that may be processed by wireless enabled devices, for instance, smart phones.

Table 1 outlines exemplary messages that may be processed by wireless enabled devices, for instance, smart phones.

DETAILED DESCRIPTION

An interactive and dynamic wireless information communication and delivery system, method and apparatus has been developed and is described herein that provides, for any or all the following: communication between transceivers and wireless-enabled devices based on software applications; a communication between transceivers and wireless enabled devices without the necessity of scanning by the wireless-enabled devices. In addition, the system, method, and apparatuses developed may further be applied to a wireless network that has transceivers having several modes of operation, including but not limited to, a limited interference mode that allows transceivers to establish selectively communication with localized wireless-enabled devices or a distant access mode that allows transceivers to communicate with distant wireless access points. Furthermore, the system, method, and apparatus developed may lead to an enhanced user experience that is achieved by combining the configurable transceiver with a modified WiFi™ protocol; and improved accuracy of the transmission of communication to the user as he or she moves around, about, or within an environment. Advantageously, the system, method, and apparatus disclosed may lead to utilization of information and experiences of other users to add information and improve accuracy of the information and experience. In addition, the system, method, and apparatus may utilize information transmitted by other users to improve the information related to the distance above, below and around the observer. Also the system, method and apparatus may be utilized for other purposes such as for configurations of systems that manage various formats of information, along with including the ability to search through the information system's history by using search mechanisms and configurations that provide promotional items or other information to a user based on the user's tracking input.

As mentioned above, there are many advantages of the developed the dynamic and interactive wireless information communication and delivery systems. Other advantages, for instance, may include that the observer may generate reduced noise and/or interference by using his/her smart phone or laptop to search for information on Internet, and companies can deliver content across both traditional "face to face" and mobile application platforms simultaneously.

In one exemplary embodiment as described below, a wireless information communication and delivery system is disclosed that includes one or more wireless-enabled devices, a device location system, a positioning and communication system, and an information repository system. Many of the systems disclosed herein may be used in other contexts, which will be disclosed herein.

Figure 1:
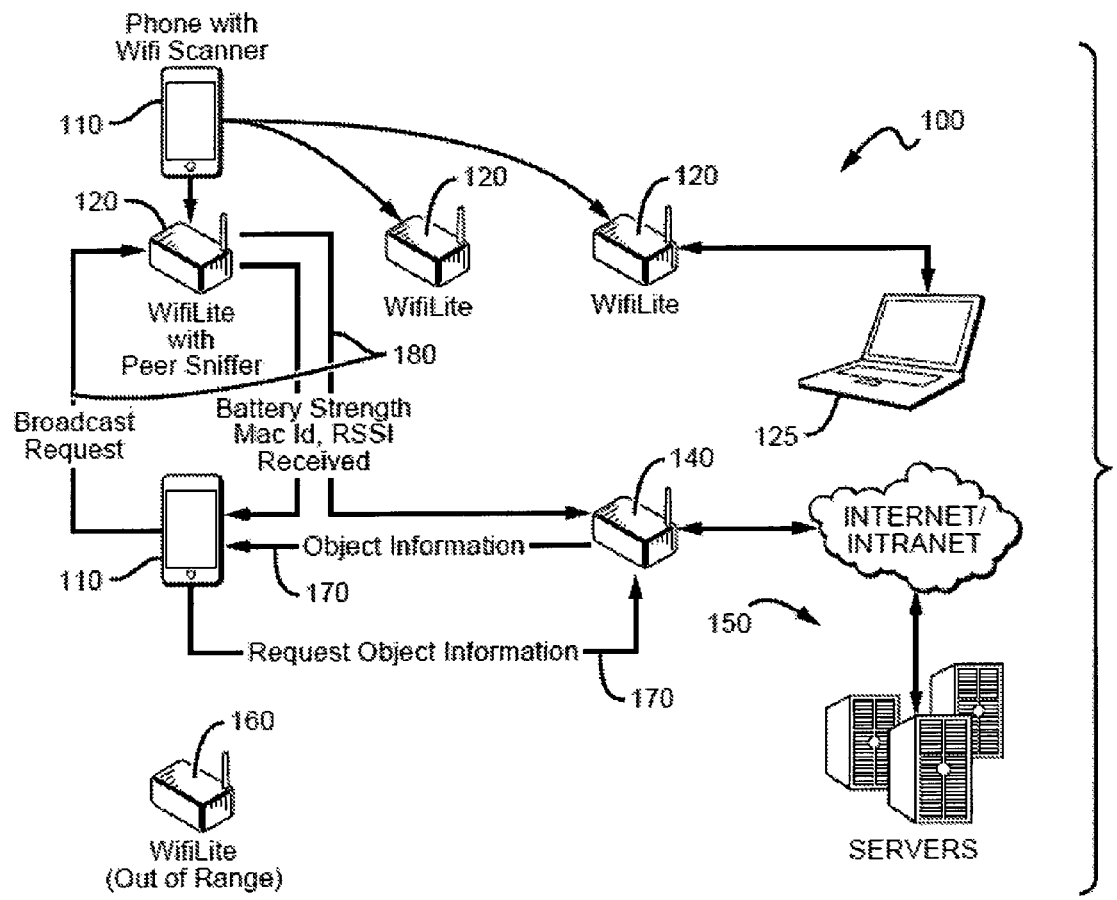
FIG. 1 shows a wireless information communication and delivery system.

FIG. 1 shows a wireless information communication and delivery system 100 includes a wireless-enabled device 110, a device location system includes one or more transceiver 120, peer laptop 125 or combination thereof, a positioning and communication system including one or more reference point or access point 140 and an information repository system 150. FIG. 1 also shows a transceiver 160 that is out of range of the wireless information communication and delivery system. A configurable wireless protocol device is disclosed that includes a multi-modal transceiver that can establish a communication network with a local wireless-enabled device, such as a smart phone or laptop. A wireless network is described that includes one or more configurable wireless protocol device, one or more wireless-enabled device, and one or more wireless access point or a combination thereof. Wireless networks may also comprise other devices or electronics, including computers, laptop computers, hand-held and/or suitable devices.

As used herein, the term "wireless" refers to wireless communication to a device or between multiple devices. Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "smart phone" refers to a wireless communication device, that includes, but not is limited to, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, RSSI, one or more indications of signal strength to data tags from one or more information repositories, a bus line, an antenna to transmit and receive signals, and power supply such as a rechargeable battery or power storage unit.

Figure 2:
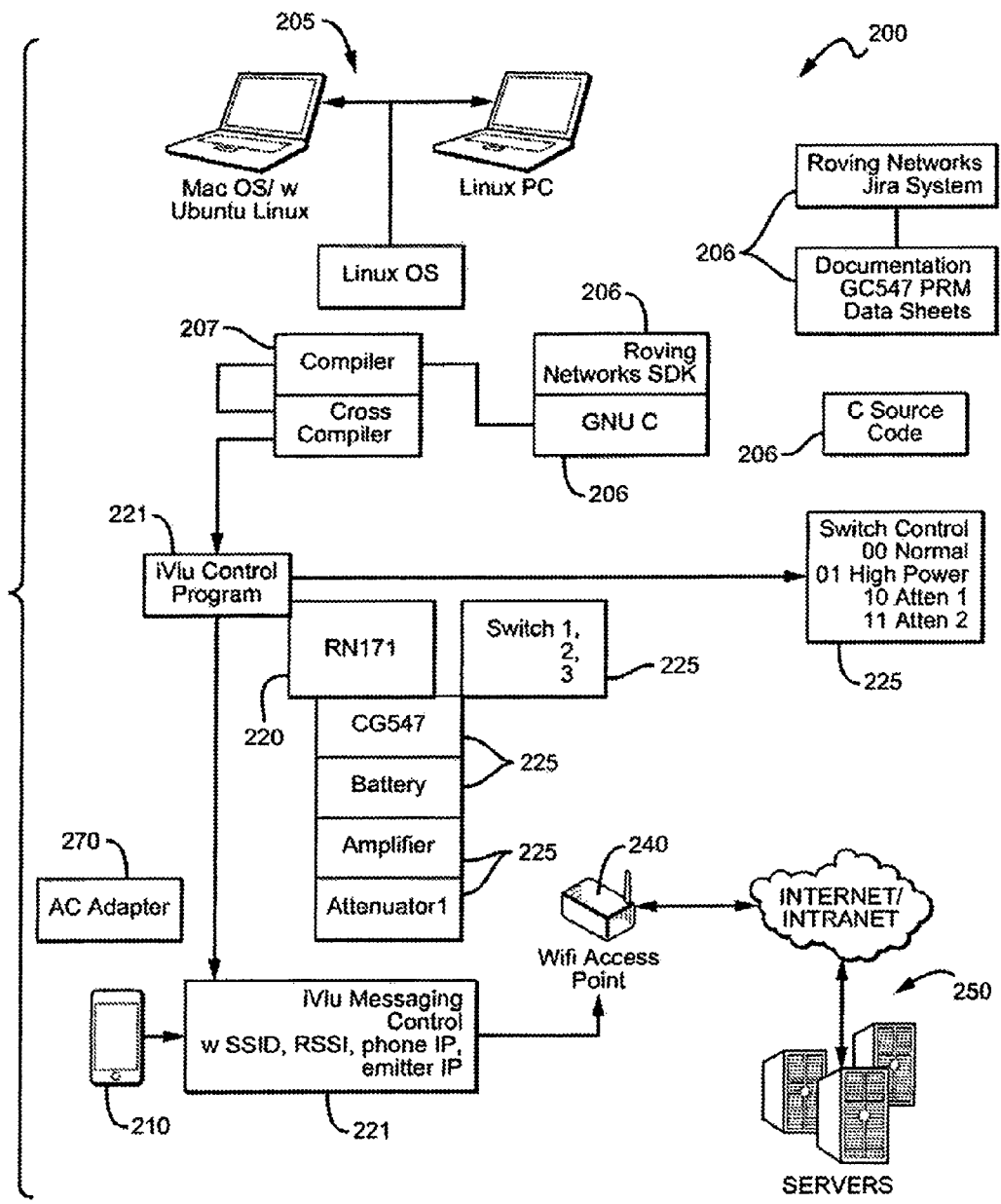
FIG. 2 shows an advanced network development diagram. A hardware transceiver is shown in FIG. 3.

FIG. 2 shows an advanced network development diagram 200 that includes a wireless-enabled device 210, a device location system comprising at least one transceiver 220 and its components 225, a positioning and communication system comprising at least one reference point or access point 240 and an information system 250. This system shows a network system developed and compiled on a computer system 205 using various available code 206 and compilers 207. The computer system 205 is then used to load the configurable wireless protocol 221 onto the at least one transceiver 220. An AC Adaptor 270 may be provided for the system 200.

Methods of locating a wireless-enabled device are described, also shown in FIG. 1 and include: providing a wireless-enabled device 110, providing a configurable wireless protocol device 120 comprising a modified wireless-protocol (not shown); and utilizing 170 the configurable wireless protocol device to actively scan 180 for the wireless-enabled device.

As mentioned, a wireless information communication and delivery system is disclosed that includes at least one wireless-enabled device. In one embodiment, wireless-enabled devices provide for or allow two-way communication or at the very least, two-way activation. In one variant, wireless-enable devices are devices capable of utilizing WiFi™, modified WiFi™ protocol or a protocol that is similar in concept and/or function as WiFi™ protocol, such as a configurable wireless protocol. If the wireless-enabled device does not provide for or allow two-way communication, then it may be able to be located by and receive communication wirelessly from another source. Exemplary wireless enabled devices include at least one mobile phone, at least one smart phone, such as the iPhone™, Android™ or Blackberry® Torch™ at least one hand-held device, at least one laptop computer, at least one personal digital assistant or PDA, at least one ear transmitter and the like or a combination thereof.

Figure 3:
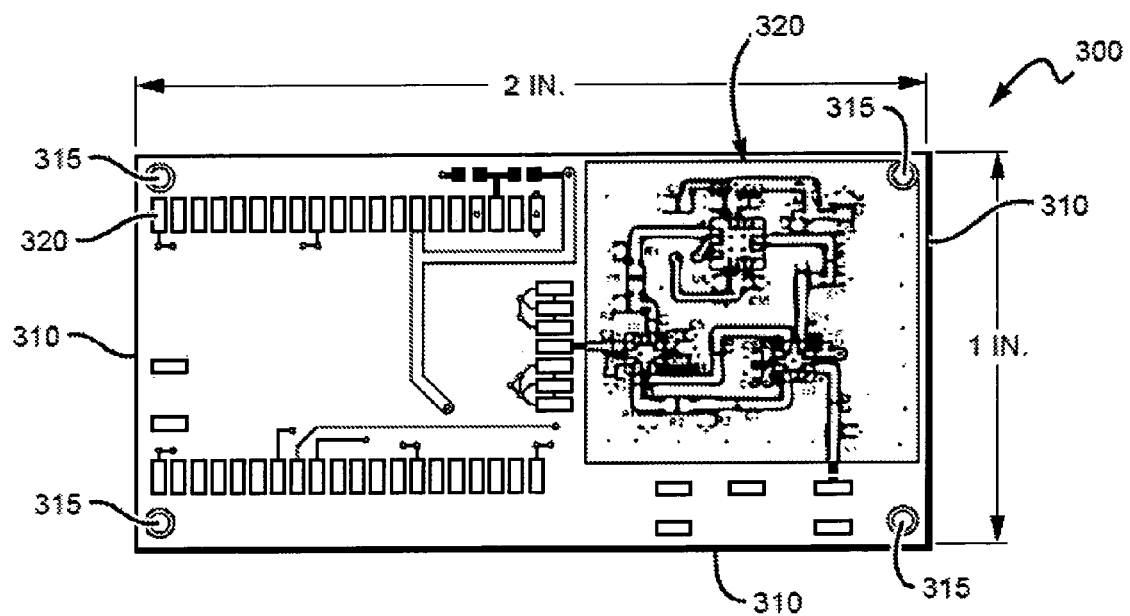

Device location systems are also included as part of a dynamic wireless network and wireless information communication and delivery system. Device location systems comprise a transceiver or configurable wireless protocol device that may actively configure its signals to enable multiple operating modes, such as short range communication, long range communication or a combination thereof. An exemplary hardware transceiver 300 is shown in FIG. 3 that comprises an outer shell or case 310 with support nubs 315 and hardwire circuitry 320 designed to operate communications systems and related software (not shown). For example, transceivers may be miniaturized, such as the one shown in FIG. 3, which is 1 inch by 2 inches. Exemplary device location systems include a modified WiFi™ protocol that allows for location of and communication with wireless-enabled devices without the wireless enabled device having to actively scan for the transceiver.

In yet another example, a wireless protocol device includes a multimodal transceiver that established a communication network with a local wireless enabled device without first being communicated to by the wireless-enabled device. In one variant, transceivers may establish a communication network with distinct wireless access points or reference points. In another variant, transceivers include a modified wireless protocol software system, which may be modified WiFi™ protocol. In yet another embodiment, a wireless protocol device includes at least one attenuator, such as those already described herein. In one variant, attenuators define an outline a range of space within which the wireless-enabled device(s) is or are detected.

In one embodiment, radio signal strength determines the distance between a device, such as a smart phone and an object that is enabled with a data tag. The radio signal strength is the strength of the radio signal transmitted between the smart phone and the data tag. In another embodiment, the smart phone and data tag may be restricted to matching communication technologies. For example, if the smart phone contains only Wi-Fi service, the data tag may be restricted to Wi-Fi. In yet another example, if the smart phone services contain only Bluetooth, then the data tag may be restricted to Bluetooth only. On the other hand, if the smart phone has Wi-Fi and Bluetooth, the data tag could use either or both, since both the data tags and the smart phone service is implemented by the smart phone manufacturer.

Referring to FIG. 7, a top level description of the iViu system is illustrated with several embodiments of the data tag including communication that occurs between the smart phone, data tag, and databases. Embodiment 1 is a Wi-Fi data tag solution and Embodiment 2 is a Bluetooth data tag solution. Embodiments 3-5 are other technology services that are supported by an iViu system. For example, other technology services include, but are not limited to, Near Field Communication (NFC), Radio Frequency Identification (RFID) and DASH7 and the like.

There are several methods available that are used to report or determine radio signal strength. One method is Relative Signal Strength Indicator (RSSI) which is, for example, reported during a Wi-Fi (or Bluetooth) communication transfer. In the iViu system, RSSI is used to calculate the distance to a data tag enabled object or to the nearest object. Below are described embodiments of the invention related to the use of data tags in conjunction with smart phones.

Wi-Fi System

In this embodiment, the iViu Wi-Fi system operation includes the Wi-Fi data tag transmitting a signal, the smart phone receiving it, and then calculating RSSI. In practice, the solution and its specific implementation(s) may change depending on type, manufacturer, or operation mode of the smart phone, e.g., Android, iPhone. More particular, specifics of IViu Wi-Fi system internal operation may depend on the type, manufacture, operation mode of the smart phone. For instance, a first smart phone (Smart Phone 1) operating in a Wi-Fi scanning mode, e.g., Android, one or more data tag(s) will transmit a periodic beacon signal and the first smart phone performs a Wi-Fi scan to obtain the beacon signal from the one or more data tag(s). The first smart phone uses the received beacon signal and calculates RSSI from it. In this methodology, the reported RSSI is the signal strength of the transmission from the data tag to the first smart phone.

On the other hand, a second smart phone (Smart Phone 2), e.g., iPhone, may not be currently operating in or in a sleep mode for Wi-Fi scanning and thereby does not provide report(s) of RSSI to iViu system. In one alternative, the second smart phone may not have Wi-Fi scanning capability. Advantageously, in either of these instances, iViu system provides another method to obtain the RSSI of the signal transmitted between the data tag and the second smart phone. The method is based upon User Datagram Protocol (UDP) communication. Since UDP is not a handshaking communication method, it does not require a "connection" between the smart phone and the data tag. Therefore, the second smart phone is able to send and receive UDP communication signals between multiple data tags.

In yet another embodiment, the second smart phone sends a UDP broadcast and every data tag that is in range of the radio signal will receive the broadcast. Continuing with this embodiment, the data tags obtain the RSSI of the signal from the second smart phone; and the data tag transmit back a UDP signal to the second smart phone with the RSSI. Therefore, in this method, the RSSI is the signal strength of the signal transmitted from the second smart phone to the data tag. In one variant, the second smart phone may have Wi-Fi services occupied with communicating in UDP mode, which may preclude the second smart phone from connecting to a Wi-Fi access point for data transfer. Thus, while the second smart phone communicates in UPD mode with the data tags, it may not receive Internet traffic from a Wi-Fi access point. Thus in this variant, the second smart phone may be restricted to only receiving Internet traffic using its phone connection, such as 3G or 4G. We can call this the Smart Phone UDP Drawback. As such, this variant may not exist for the other embodiments, such as the Bluetooth or RFID implementation.

Referring to FIG. 8, a communication method is illustrated between the Smart Phone and Wi-Fi data tag. It shows the UDP messaging between the second smart phone and the Wi-Fi data tag, as well as the beacon signal from the data tag and the first smart phone. Another embodiment is the use of the data tags in a dual mode, e.g., Time Multiplexing arrangement. Continuing with this embodiment, during Time 1, the data tag operates in beacon mode for communication with the first smart phone. During Time 2, the data tag operates in UDP mode for communication with the second smart phone. By switching between communication modes at different time intervals, the data tag is able to Time Multiplex and communicates to both the first smart phone and the second smart phone.

In yet another embodiment, an implementation to the smart phone UDP Drawback is disclosed. The solution is based upon the fact that, for instance, a second smart phone may not be in a continual mode of searching for nearby objects. During operation of the iViu application or system, the user switches from a list of nearby objects to obtaining information about a specific object. During the time that the user is out of the list of nearby objects, the phone is switched from the mode of searching for nearby data tags and the phone establishes a link to the Wi-Fi infrastructure. While connected to the Wi-Fi infrastructure, the second smart phone makes a connection to Internet and the Cloud database with information about objects.

Advantageously in this embodiment, while connected to the Wi-Fi infrastructure, the user performs non-data tag related activities, for instance, surfing the web, watching a video, and/or listening to audio or reading text. Once the user returns to the mode of searching for nearby data tags, the second smart phone operating system terminates the connection to the server and restarts UDP broadcasts and messaging with the data tags.

Bluetooth Connectivity

In yet another embodiment, the smart phone obtains RSSI during the discovery process of the Bluetooth data tag. During the discovery process, the first smart phone (Smart Phone 1) may report to its operating system the RSSI of each Bluetooth device it has discovered. The first smart phone uses that information to calculate the distance to objects or the nearest object.

On the other hand, the second smart phone (Smart Phone 2) may have restricted ability to report the RSSI of discovered Bluetooth devices. Consequently, the second smart phone may require the Bluetooth transmission from the data tag to include an encrypted message that identifies the data tag as a manufacture approved product. In one variant, encryption is accomplished by attaching for instance, a special Integrated Circuit (IC), e.g. an MFI chip, to the one or more Bluetooth device.

During the Bluetooth discovery process, the IC sends an encrypted message to the Bluetooth device which is forwarded to the second smart phone. The second smart phone recognizes the encoded message and opens functionality within. Following, operation of the iViu application using the first or the second smart phone are very similar, e.g., the first or second phone uses the RSSI to determine the nearest objects and then serves up information to the user about the nearest object.

Additional Features

In one embodiment, the iViu application and database approach and its operation are independent upon the type of data tag implemented. As additional services are added to the smart phones, the data tag will be adapted to communicate using them. Some examples of possible future services are NFC, RFID, and DASH. An exemplary device location system utilizes native TCP IP protocols to permit detection of relative distance or a specific distance range and those wireless-enabled devices within that distance range without the wireless-enabled device having to scan for the remote, configurable wireless devices. As such, the smart phone may communicate with the data tag even when type of scanning may be disabled. In one variant, one or more device location systems may be incorporated with attenuators to attenuate the signal, which enables the wireless information communication and delivery service to control the range within which the signal will be received.

As will be described in greater detail later, an exemplary configurable wireless device is disclosed of a device that is a part of the wireless information communication and delivery system and is in communication with one or more components, including the wireless-enabled device, the positioning and communication system and the information repository system. In one variant, configurable wireless devices are generally fixed position or stable. In a first instance, the configurable wireless devices may be located near or proximal to a trade show booth, a piece or work of art, or a particular retail item or store location. In a second instance, the configurable wireless devices may be located near or proximal to a ride or attraction at a theme park, an item or group of items that are inventoried or any other article, item or service that someone would be interested in learning more about at a particular time.

In yet another embodiment, some features of device location systems include that the systems comprise configurable wireless protocol or WiFi™ devices, have a modified wireless or WiFi™ protocol combinable with the configurable WiFi™ devices or transceiver. In one variant, these device location systems may be able to control "slave" or dumb devices in order to allow implementation in environments where very low cost devices are required.

In another embodiment, such as Wi-Fi AdHoc mode shown in FIG. 5, there do not need to be any WiFi™ hubs for Internet connection, as mentioned earlier. The configurable wireless protocol device, such as a smart phone, would connect to the AdHoc network when they first arrive in the dynamic wireless network venue or space. In one embodiment, a wireless protocol device does not need to connect to Internet. In one variant of this embodiment, data is not sent to and from Internet while the wireless protocol device is in the venue or space.

In another example, AdHoc networks may provide and send messages between the device location systems, the positioning and communication systems and the wireless protocol device, e.g., one or more smart phones. In this example, because there is no Internet connection on this network, the wireless protocol device will be smart enough to maintain their cell phone carrier's Internet connection, which allows the phones to communicate with the device location systems and the positioning and communication systems via User Datagram Protocol (UDP). The Received Signal Strength Indicator or RSSI will be determined from the UDP messages, and that will indicate which wireless protocol device, e.g., one or more smart phones, the phone is near. As such, the cell phone carrier's Internet connection may be used to communicate with the information repository system to determine with which objects the device location systems and the positioning and communication systems are associated.

Other exemplary dynamic wireless networks and wireless information communication moreover, delivery systems may include a positioning and communication system. These positioning and communication systems provide a measure of accurately and more precisely locate an observer from a number of different vantage points, distance ranges and a number of different time characteristics. The time characteristics may include, for instance, how long the person stands in front of a particular exhibit or booth. Observers are detected by nearby devices and tagged objects, and the relative signal strength will be communicated to the positioning and communication system to let the dynamic wireless network know that the observer is in range of a particular tagged area, including a tagged object, booth, room or other item.

In still other embodiments, positioning and communication systems include a relative location system. These relative location systems may include at least one reference or access point that communicates with the wireless network and wireless information and communication system, along with communicating with one another. In one variant, the relative location system may collect information from the wireless-enabled device, including how long the device (user/observer) stood in a certain place or in front of a certain object (object level accuracy) and send that information to the information repository system.

Advantageously, with a position and communication system, observers not only would get a list of items, objects or locations, but also would obtain valuable additional information, for instance, whether the tagged objects are to their left, right, in front, in back, above or below them. In other words, the observers would obtain distance without any relative direction. The position and communication system uses the fact that observers are in an environment and that the observers move, giving them a different signal strength and estimated distance as they move around in the environment. If one object shows a stronger signal as observer moves, while another object fades, the system will determine that the user is moving toward the object. As larger and larger numbers of these observations of users at different points are recorded, the "perspectives" in the information system are gathered and then used to provide a "learning" method by which more and more accurate information evolves.

In another embodiments, certain "reference" points may be established using the higher power WiFi™ access points in a room that will be place or, if they are already there, will have their coordinate positions relative to a room entrance recorded. The signals from these objects will provide a base from which to calibrate the signals from the other tagged devices and objects in the room. The strength and desirability of these exemplary systems allow tagged object to be located with a level accuracy in a range of, for instance, 1 to 2 meters from the tagged object.

For example, this accuracy level is possible because the exemplary wireless information communication and delivery systems use special WiFi™-based or wireless protocol-based tags that intentionally control the signal level combined with the position learning system to provide the increase object level accuracy rather than room level accuracy.

In another embodiment, a positioning and communication system that is part of a dynamic wireless network includes a relative location system. The relative location system assigns a user different or unique signal strength and estimated distance as the user moves around in a specific environment. For example, the specific environment may include a museum, a room, a trade show floor, a historic house, an automobile show, a geographic location, an amusement park, a retail location or a shopping mall.

In one variant, wireless-enabled device may use the TCP/IP broadcast/receive mechanism used in the wireless information communication and delivery systems. Other wireless-enabled device models that allow WiFi™ scanning will use scanning to get the same signals and thus reduce the amount of message traffic necessary, while at the same time save battery life on the tagged objects and related devices. Device based solution associated with a software only solution on the wireless-enabled devices provides an unprecedented level of detail for solutions without any custom hardware on the observer wireless-enabled devices. In yet another variant, wireless information communication and delivery systems may require that software-based digital data tags be associated with the tagged objects and appropriate applications software be downloaded and activated on the wireless-enabled devices as shown, for instance, in FIG. 4 and described in the Examples section.

In one embodiment, wireless information communication and delivery systems may include one or more information repository systems. The information repository systems may include a database or other storage means for storing information about the tagged objects or locations, e.g., whether they are pieces of art, rooms in a historic house, trade show booths and other tagged objects or locations. In one variant, objects and locations that are associated with a place may also be related to associated objects. In another variant, place and object relationships are additionally recursive, so that a place contained in another place may also itself contain other places. In yet another variant, the same is true for objects.

In another embodiment, information repository systems includes a database or other storage means to store information about the observers, users or customers with wireless-enabled devices that are in use with the wireless information communication and delivery system. Information about these tagged places and objects contains associated Uniform Resource Identifiers (URIs). A URI may contain a single Uniform Resource Locator (URL) if it is just a web page or the URI could itself contain various types of information such as videos, audio files, pictures, HTML pages, etc. The information can be updated on the fly or in real time, as information is generated about the item, object, event or company.

In one variant, places and objects may be tagged to both absolute (longitude and latitude) and in addition, relative (x, y, z coordinates based on an entry point) locations. The repository includes a history of movements by observers around the environment. The information repository also includes a "transactions" component that will track expressions of interest by observers in places and objects as well as their route through the places enabled for this type of wireless information communication and delivery systems. The perspectives history contained in wireless information communication and delivery systems enables the positioning functionality used by the position and communication system, which, as mentioned, records distance, signal strength and other information related to the current position of the observer.

In another embodiment, the position and communication system works in concert with the information repository system to track users within the environment, e.g., develop sophisticated demographics and analytics of the users and to push out information regarding moved tagged objects, new or recently tagged objects to the environment, or obtain new information regarding tagged objects and other valuable information. In one variant, systems may allow users to retrieve real-time information regarding objects they are viewing as well as replaying their routes and the information regarding objects that they may have bookmarked during the tour or visit.

In yet another embodiment, one or more timing issues may arise between the wireless protocol device, the device location systems and the positioning and communication systems, as shown in FIG. 6. When engaged by, for instance, an appropriate app, a chosen software application or another software interface, the wireless protocol device will be in "receive mode". The device location systems and the positioning and communication systems, however, will go into "hibernate" or "sleep mode" either manually or automatically, after a certain amount of inactivity. In this case, various methods can be used to solve any timing issues between the devices and systems.

In one embodiment, the device location systems and/or the positioning and communication systems, wake up and broadcasts a message. The wireless protocol device receives the broadcast message and determines which system it is near. At this point, there are some wireless protocol devices, such as the first smart phone, that are engaged at this point and don't need to proceed forward. However, there may be other wireless protocol devices, such as the second smart phone, that may require additional steps. In these embodiments, the wireless protocol device will send its own broadcast back to the system. The system/systems then record the IP address and RSSI for the device and returns a second message to the identified device. The systems may then enter sleep or hibernation mode for a predetermined amount of time, such as milli-seconds, seconds, minutes or hours.

Messaging Protocol for Positioning of Smart Phone

Referring to Table 1, there are outlines of messages that can be processed by wireless-enabled devices, i.e., smart phones. These messages are further described below. FIG. 4 illustrates a digital tag system 400 that may be used for a configurable transceiver. After start 410, the transceiver waits for broadcast 420 and sends or receives several messages, such as Timed Out 421, Hi Power 422, Send Battery Level 423 or Broadcast Received 430. The Broadcast Received mode 430 sends a device query 431 and sends the response 432 back to the transceiver. The Broadcast Received mode 430 will also send a request to the Preferences Mode 440, which is described below.

Continuing with this example, Messages IV00001 and IV00002 are the messages received from and sent to the phones respectively. IV00001 will be received from phones probing for signal strength and thus, proximity. An IV00001 message will contain a comma separated message that will include: IP:xxx.xxx.xxx.xxx, which is the IP of the sending, phone. These IV00001 messages will be broadcast to all devices in range so that all digital tags or OTs receiving this message can respond with their signal strength.

The phone will respond with IV00002, which will contain the device 10 of the device: Initially the MAC address of the wifi-lite or transceiver digital tag. It will also return the signal strength with which it received the IV00001 message from the phone. In one variant, the device will be placed in "Sniffer" mode so that it will see all messages on the network even though it is in "Infrastructure" mode, which would normally ignore any messages not sent to it as an access point. In this "Sniffer" mode, the OT will receive the RSSI directly from the sending phone whereas in normal Infrastructure mode the RSSI would be the RSSI from the nearest access point which would not provide the necessary positioning information to the phone. The responding message will return directly to the phone that sent it.

Preferences Settings Mode

Because the devices may be encountered in a wide diversity of settings the need for them to operate efficiently, saving energy and thus prolonging battery life while also providing rapid response to nearby Observers, the devices will have a "Preferences" mode 440. These preferences will allow the optimization based on the following considerations: a) memory for stored messages and b) response time to requests. For example if we have 100 people moving around and requesting their position every two seconds that would be 30×100 or 3,000 messages per minute. If it slept a minute it would have a long list of messages, plus users wouldn't get answers back until they had probably moved beyond the both where the device is located. If we are fast enough we can probably get away with a 1 second sleep but because we really cannot expect to use a fixed number.

Referring to FIG. 4, Preferences Mode 440 is illustrated where various preferences are, for example, setting battery level frequency 441, TX output control 442, SW1 Control 443, SW2 Control 444, SW3 Control 445, Receive Time 446, Transmit Time 447, Standby Time 448, and Sleep Between Commands Time 449. There may be other preferences as systems are utilized and configured. Preferences Messages: Message IV10000 places the device in "Preferences Mode so that all preferences messages while in this mode will cause changes to the stored preferences. IV19999 with a "1" will cause the device to exit the preferences mode and store the changes in persistent memory. If a "0" is sent with IV19999 the DT will exit preferences mode and throwaway all changes made since entering preferences mode.

Referring to Table 1, Device Tags Messaging Protocols are disclosed. The preferences mode will allow control of: Battery time before power level update. Message (Table 1) IV20001. This sets the time, in minutes, between the sending of the battery level of the DTs. This is done to monitor the batteries for the need to replace them. The DTs will have to be put in high power mode so that the signal will reach the nearby access points and not just the phones within the low power range. This will be a 5 digit number from 0 to 99999 minutes. 0 indicates that the DT never sends battery information; b) Settings for switches 1, 2, 3 IV20002 sends a 3 digit number from 000 to 111. The Os and 1s indicate the on off state for switches 1, 2 and 3 by position. So, for example, value 111 would turn on all three switches while 010 would turn on switch 2 and turn switches 1 and 3 off; c) Sleep Time; and d) Variable transmit power.

Development Technology: Code will be developed using a GNU C compiler with code cross compiled to the RN171 chip using a development board. Eclipse will be used as a development IDE with the C plug in utilized. Change Control: CVS Change control will be used to provide version control and development team collaboration. Debugging: The GNU Debugger will be used for Debugging.

Referring to flowchart 600 of FIG. 9, a method is disclosed for calculating a distance to objects or a nearest object to a wireless enabled device.

In step 602, the wireless enabled device broadcasts a signal to data tags within a distance range. In one variant of step 602, the signal by the wireless enabled device includes a User Datagram Protocol (UDP) and the signal strength indicator is computed from the UDP by each of the data tags within the distance range of the wireless enabled device. In another variant of step 602, a signal by the wireless enabled device broadcasted to data tags in the range includes broadcasting using an AdHoc network for sending messages between device locations systems, the positioning and communications system, and the wireless enabled device. In another variant of step 602, broadcasting a signal by the wireless enabled device to data tags in the range includes communicating broadcasting a signal including a WI-FI scanning signal by the wireless enabled device to the data tags.

In yet another variant of step 602, a beacon signal is transmitted by the data tags within the range of the wireless enabled device and the wireless enabled device performs a Wi-Fi scan to obtain the beacon signal and the wireless enabled device calculates the Signal Strength Indicator in response to a received beacon signal. In yet another variant of step 602, the signal strength indicator of the wireless enabled device is attenuated to control range within which transmitting by each of the data tags in the distance range a signal to the wireless enabled device including the signal strength indicator of the wireless enabled device. In yet another variant of step 602, a beacon signal is transmitted by the data tags within the range of the wireless enabled device and the wireless enabled device performs a WiFi scan to obtain the beacon signal and the wireless enabled device calculates the Signal Strength Indicator in response to a received beacon signal.

In step 604, the data tags receive within the distance range the signal by the wireless enabled device. In one variant of step 604, each of the data tags obtain by each of the data tags within the distance range a signal strength indicator of the wireless enabled device based on the signal from the wireless enabled device.

In step 606, each of the data tags transmit in the range a signal to the wireless enabled device including the signal strength indicator of the wireless enabled device.

In step 608, each signal strength indicator of the wireless enabled device is communicated to a positioning and communication system. In one variant of step 608, a relative location system communicates including at least one reference or access point configured to communicate with a wireless information and communication network and to collect information about the wireless enabled device. In another variant of step 608, the information about the wireless enabled device includes how long a user stood in a certain place or in front of a certain object and send information to an information repository that includes a transaction component that tracks expressions of interest of observers in places and objects as well as a route of the observers through the places. In another variant of step 608, each signal strength indicator is communicated of the wireless enabled device includes each of the data tags communicate with a dynamic wireless network each signal strength indicator that indicates which data tags or tagged objects are included within the dynamic wireless network.

In yet another variant of step 608, each signal strength indicator is communicated of the wireless enabled device includes the wireless enabled device communicates with a dynamic wireless network each signal strength indicator that indicates which data tags or tagged objects that are part of the dynamic wireless network. In another variant of step 608, each signal strength indicator of the wireless enabled device communicated to a positioning and communication system includes a relative location system that communicates each signal strength indicator to a WI-FI network to communicate location based on relative signal strength within an information repository which objects a device location system and the positioning and communications system are associated.

In step 610, information about objects with the distance range of the data tags is communicated to the wireless enabled device. For example, a positioning and communication system communicates with each of the data tags within the distance range and receive at least one signal strength indicator of each of the at least one wireless enabled device. Continuing with this example, a positioning and communication system communicates with each of the one or more wireless enabled device(s) to deliver information about objects with the distance range of the data tags.

Continuing with the embodiment, the system includes data tags configured to receive a signal transmitted by at least one wireless enabled device within the distance range. In one variant, each of the data tags obtains within the distance range a signal strength indicator from the signal transmitted from each of the wireless enabled device; and in response, each of the data tags transmits within the distance range a signal to the wireless enabled device including the signal strength indicator of each of the at least one wireless enabled device. In one variant, the system may include a positioning and communication system configured to communicate with each of the data tags within the distance range and receive at least one signal strength indicator of each of the at least one wireless enabled device and communicate with each of the at least one wireless enabled device to deliver information about objects with the distance range of the data tags.

Furthermore, the signal transmitted by the wireless enabled device includes a User Datagram Protocol (UDP) and the signal strength indicator is computed from the UDP by each of the data tags in the distance range of each of the at least one wireless enabled device. In yet another variant, a relative location system may be utilized that includes at least one reference or access point configured to communicate with a wireless information and communication network and to collect information about each of the at least one wireless enabled device within the distance range. In another variant, the information about the wireless enabled device includes how long a user stood in a certain place or in front of a certain object and send information to an information repository that includes a transaction component that tracks expressions of interest of observers in places and objects as well as a route of the observers through the places.

In yet another embodiment, each signal strength indicator of the wireless enabled device communicate to each of the data tags and communicate with a dynamic wireless network each signal strength indicator that indicates which data tags or tagged objects to a dynamic wireless network. In still another embodiment of this system, communicating each signal strength indicator of the wireless enabled device includes the wireless enabled device communicates with a dynamic wireless network each signal strength indicator that indicates which data tags or tagged objects that are part of a dynamic wireless network. In another embodiment of the system, an Adhoc network configured to send messages between device locations systems, the positioning and communications system, and the wireless enabled device.

In still another embodiment, a relative location system may communicate with the positioning and communication system communicating each signal strength indicator of the wireless enabled device to a positioning and communication system having a relative location system includes communicating each signal strength indicator to a Wi-Fi network to communicate location based on relative signal strength within an information repository from which objects a device location system and the positioning and communications system are associated. The system may further include the wireless enabled device broadcasting a signal to data tags in the range comprises communicating broadcasting a signal including a Wi-Fi scanning signal by the wireless enabled device to the data tags. The system may further include attenuating the signal strength indicator of the wireless enabled device to control range within which by each of the data tags in the range transmit a signal to the wireless enabled device including the signal strength indicator of the wireless enabled device. In yet another variant, transmitting a beacon signal by the data tags within the range of the wireless enabled device and the wireless enabled device performs a Wi-Fi scan to obtain the beacon signal and calculates the Signal Strength Indicator in response to a received beacon signal.

Referring to FIG. 10, system 700 is disclosed that measures relative signal strength of a wireless enabled device that broadcasts a signal within a distance range of objects that are associated with data tags as illustrated in FIGS. 1-9, Table 1 and associated text. For instance, system 700 communicates, for instance, using communications server 716 by wired bus 718 or wireless means, such as Bluetooth or Wi-Fi, connectivity with private and public databases, though communications server 704, 712 having wireless capability to access, for instance, information repository 706, 708 coupled to bus 710 and extracts information, e.g., RSSI, from a nearby smart phone 736, for instance, Smart Phone 1 and Smart Phone 2 illustrated in FIGS. 1-9 and associated text or in Table 1.

System 700 further includes data storage hardware device 714 capable of storage of user data, e.g., preferences, interests, "perspectives" in the information system, relative coordinates of smart phone 736 and/or user 738 using the smart phone 736 to an object, e.g., painting 744, 740, 732, or Wi-Fi device or data tags 742, 738, 734 associated with or closest to the object. For example, a particular item or location, e.g., as well as other information, for instance, relative location or distance from one or more of data tags 742, 738, 734 that are referenced, for instance, to an object 744, 738, 732 respectively or other components disclosed in FIGS. 1-9 and Table 1 on a temporary, transitory, or permanent basis. Application server 702 stores executable software program code, for instance, RSSI signal strength calculation or User Datagram Protocol (UDP) algorithms in a semi-transitory or non-transitory software media capable of transferability using communications server 716 to transmit wired or wirelessly from processor unit 724, for example, communicatively coupled to computer 720 that has a keyboard 702 to allow, for instance, user 738 to provide remote inputs or direct inputs (if user is within range of keyboard 722).

Continuing with this embodiment, system 700 may store executable software program code in application server 702 in one or more tangible forms, for example, in a communicatively coupled to memory 726 (which may be ram, flash, or flash drive) or persistent storage 730 such as a hard drive or rewritable hard-disk external (that may be fixed or removable) communicatively coupled to computer 720, for instance, through bus line, e.g., bus line 718.

In one embodiment, communications server 716 transmits wirelessly to another network, e.g., radio towers, cell-phone towers, communication satellites, or the like, to access files stored in databases 706, 708 (e.g., private databases). In one variant, the databases 706, 708 are one or more information repositories accessible through communication servers 704, 712 and coupled wirelessly, e.g., using data tags 742, 738, or 734 or smart phone 736 or wired, for instance, to bus line, e.g., bus lines 71, 710. In another variant, communications server 704 transmits wirelessly to another network, e.g., radio towers, cell-phone towers, communication satellites, or the like to access files or documents stored in database 714, for instance, accessible through bus line, e.g., bus line 718. In yet another example, system 700 may be stored in memory in a consumer apparatus or smart phone 736 (e.g., a hand-held computer with plug in serial, parallel, or usb adaptor compatibility) through bus line 710, 718 or wirelessly coupled using a local network, e.g., wireless servers 716, 704, 712 or through cell phone towers, communication satellites to access, for instance, one or more databases 714, 706, 708 for accessing sets of consumer data processing by system 700.

In summary, specific embodiments and applications of dynamic wireless networks and interactive wireless information communication and delivery systems have been disclosed. It should be apparent, however, to those skilled in the art that many more modifications besides those already described are possible without departing from the inventive concepts herein. The inventive subject matter, therefore, is not to be restricted except in the spirit of the disclosure herein. While the above detailed description has shown, described, and pointed out novel features of the invention as applied to various embodiments, it will be understood that various omissions, substitutions, and changes in the form and details of the device or process illustrated may be made by those skilled in the art without departing from the inventive concepts herein. Furthermore, the foregoing description includes the best mode presently of carrying out the inventive concepts and matters.

Moreover, in interpreting the disclosure, all terms and claims should be interpreted in the broadest possible manner consistent with the context. In particular, the terms "comprises", "comprising", "including", and "includes" should be interpreted as referring to elements, components, or steps in a non-exclusive manner, indicating that the referenced elements, components, or steps may be present, or utilized, or combined with other elements, components, or steps that are not expressly referenced. This description of the embodiments disclosed is in no way meant to be limiting, but rather should be taken as illustrative of the general principles of the inventive concepts therein and one or more embodiments may be combined together and this combination is within scope of the present inventive concepts or matter. In addition, one skilled in the art would appreciate that elements of one or more embodiments, for instance, method steps for measuring relative signal strength disclosed in FIG. 9 or system disclosed in FIG. 10, may be combined together, rearranged, or eliminated to achieve still other embodiments that are within the teachings and scope of the present application.

We claim:

1. A method for calculating a distance to objects or a nearest object to a wireless enabled device, the method comprising:
    broadcasting a signal by the wireless enabled device to data tags within a distance range;
    receiving by the data tags within the distance range the signal by the wireless enabled device;
    obtaining by each of the data tags within the distance range a signal strength indicator of the wireless enabled device based on the signal from the wireless enabled device;
    transmitting by each of the data tags in the range a signal to the wireless enabled device including the signal strength indicator of the wireless enabled device;
    communicating each signal strength indicator of the wireless enabled device to a positioning and communication system; and
    communicating to the wireless enabled device information including the distance to the objects or nearest object within the distance range of the data tags.

2. The method of claim 1, wherein the signal by the wireless enabled device includes a User Datagram Protocol (UDP) and the signal strength indicator is computed from the UDP by each of the data tags within the distance range of the wireless enabled device.

3. The method of claim 1, further comprising communicating by a relative location system that includes at least one reference or access point configured to communicate with a wireless information and communication network and to collect information about the wireless enabled device.

4. The method of claim 3, wherein the information about the wireless enabled device includes how long a user stood in a certain place or in front of a certain object and send information to an information repository that includes a transaction component that tracks expressions of interest of observers in places and objects as well as a route of the observers through the places.

5. The method of claim 1, wherein communicating each signal strength indicator of the wireless enabled device includes each of the data tags communicate with a dynamic wireless network each signal strength indicator that indicates which data tags or tagged objects are included within a dynamic wireless network.

6. The method of claim 1, wherein communicating each signal strength indicator of the wireless enabled device includes the wireless enabled device communicates with a dynamic wireless network each signal strength indicator that indicates which data tags or tagged objects that are part of the dynamic wireless network.

7. The method of claim 1, wherein broadcasting a signal by the wireless enabled device to data tags in the distance range includes broadcasting using an AdHoc network for sending messages between device locations systems, the positioning and communications system, and the wireless enabled device.

8. The method of claim 1, wherein communicating each signal strength indicator of the wireless enabled device to a positioning and communication system includes communicating each signal strength indicator to a Wi-Fi network to communicate location based on relative signal strength within an information repository which objects a device location system and the positioning and communications system are associated.

9. The method of claim 1, further comprising broadcasting a signal by the wireless enabled device to data tags in the range includes communicating broadcasting a signal including a Wi-Fi scanning signal by the wireless enabled device to the data tags.

10. The method of claim 1, further comprising attenuating the signal strength indicator of the wireless enabled device to control range within which transmitting by each of the data tags within the distance range a signal to the wireless enabled device including the signal strength indicator of the wireless enabled device.

11. The method of claim 1, further comprising transmitting a beacon signal by the data tags within the distance range of the wireless enabled device and the wireless enabled device performs a Wi-Fi scan to obtain the beacon signal and the wireless enabled device calculates the Signal Strength Indicator in response to the received beacon signal.

12. A system for measuring relative signal strength of a wireless enabled device within a distance range for objects, the system comprising:
    data tags configured to receive a signal transmitted by at least one wireless enabled device within the distance range, each of the data tags obtains within the distance range a signal strength indicator from the signal transmitted from each of the wireless enabled device; and in response, each of the data tags transmits within the distance range a signal to the wireless enabled device including the signal strength indicator of each of the at least one wireless enabled device; and
    a positioning and communication system configured to communicate with each of the data tags within the distance range and receive at least one signal strength indicator of each of the at least one wireless enabled device and communicate with each of the at least one wireless enabled device information about objects with the distance range of the data tags.

13. The system of claim 12, wherein the signal transmitted by the at least one wireless enabled device includes a User Datagram Protocol (UDP) and the signal strength indicator is computed from the UDP by each of the data tags in the distance range of each of the at least one wireless enabled device.

14. The system of claim 12, further comprising a relative location system that includes at least one reference or access point configured to communicate with a wireless information and communication network and to collect information about each of the at least one wireless enabled device within the distance range.

15. The system of claim 14, wherein the information about the at least one wireless enabled device includes how long a user stood in a certain place or in front of a certain object and send information to an information repository that includes a transaction component that tracks expressions of interest of observers in places and objects as well as a route of the observers through the places.

16. The system of claim 12, wherein each signal strength indicator of the at least one wireless enabled device includes each of the data tags communicates with a dynamic wireless network each signal strength indicator to obtain which data tags or tagged objects are part of a dynamic wireless network.

17. The system of claim 12, further comprising an Adhoc network configured to send messages between device locations systems, the positioning and communications system, and the at least one wireless enabled device.

18. The system of claim 12, further comprising a relative location system that communicate with the positioning and communication system communicating each signal strength indicator of the at least one wireless enabled device to a positioning and communication system includes the relative location system that communicates each signal strength indicator to a Wi-Fi network to communicate location based on relative signal strength within an information repository from which objects a device location system and the positioning and communications system are associated.

19. The system of claim 12, further comprising each of the data tags being configured to attenuate the signal strength indicator of the at least one wireless enabled device to control range within which by each of the data tags in the distance range transmit a signal to the at least one wireless enabled device including the signal strength indicator of the at least one wireless enabled device.

20. The system of claim 12, further comprising each of the data tags transmits a beacon signal by the data tags within the range of the at least one wireless enabled device and the at least one wireless enabled device performs a Wi-Fi scan to obtain the beacon signal and calculates the Signal Strength Indicator in response to a received beacon signal.

\* \* \* \* \*